United States Patent
Rao et al.

(10) Patent No.: US 10,565,373 B1
(45) Date of Patent: Feb. 18, 2020

(54) BEHAVIORAL ANALYSIS OF SCRIPTING UTILITY USAGE IN AN ENTERPRISE

(71) Applicant: CA, Inc., San Jose, CA (US)

(72) Inventors: Akshata Krishnamoorthy Rao, Mountain View, CA (US); Douglas Schlatter, Playa Vista, CA (US); Adam Glick, Culver City, CA (US); Feng Li, Richmond Hill (CA)

(73) Assignee: CA, Inc., San Jose, CA (US)

( * ) Notice: Subject to any disclaimer, the term of this patent is extended or adjusted under 35 U.S.C. 154(b) by 190 days.

(21) Appl. No.: 15/437,759

(22) Filed: Feb. 21, 2017

(51) Int. Cl.
*H04L 29/06* (2006.01)
*G06F 21/55* (2013.01)

(52) U.S. Cl.
CPC ...... *G06F 21/552* (2013.01); *G06F 2221/033* (2013.01)

(58) Field of Classification Search
CPC . H04L 63/14; H04L 63/1408; H04L 63/1416; H04L 63/1425; H04L 63/1441; H04L 63/145; H04L 63/1466; G06F 21/55
See application file for complete search history.

(56) References Cited

U.S. PATENT DOCUMENTS

| | | | | |
|---|---|---|---|---|
| 7,150,044 B2 * | 12/2006 | Hoefelmeyer | ...... | H04L 63/0272 726/23 |
| 8,230,505 B1 * | 7/2012 | Ahrens | ...... | G06Q 10/02 726/23 |
| 9,166,993 B1 * | 10/2015 | Liu | ...... | H04L 63/1425 |
| 9,450,979 B2 * | 9/2016 | Keromytis | ...... | G06F 11/08 |
| 9,537,880 B1 * | 1/2017 | Jones | ...... | H04L 63/1425 |
| 10,104,100 B1 * | 10/2018 | Bogorad | ...... | H04L 63/1425 |
| 2003/0172302 A1 * | 9/2003 | Judge | ...... | H04L 63/1416 726/22 |
| 2007/0061882 A1 * | 3/2007 | Mukhopadhyay | .... | G06F 21/552 726/23 |
| 2007/0094729 A1 * | 4/2007 | Hoefelmeyer | ...... | H04L 63/0272 726/23 |
| 2008/0071728 A1 * | 3/2008 | Lim | ...... | G06F 21/604 |
| 2010/0074112 A1 * | 3/2010 | Derr | ...... | H04L 41/12 370/232 |
| 2013/0108045 A1 * | 5/2013 | Sanders | ...... | H04L 9/0847 380/260 |
| 2013/0298244 A1 * | 11/2013 | Kumar | ...... | G06F 21/52 726/25 |

(Continued)

OTHER PUBLICATIONS http://go.cybereason.com/rs/996-YZT-709/images/Cybereason-Labs-Research-Analysis-Fileless-Malware.pdf, By Ian Muller, Yonatan Striem_Amit and Amit Serper; 2012.

(Continued)

*Primary Examiner* — Eric W Shepperd
(74) *Attorney, Agent, or Firm* — Maschoff Brennan (57) ABSTRACT

A method for behavioral analysis of scripting utility usage in an enterprise is described. In one embodiment, the method describes receiving, by a processor, data associated with execution of a scripting utility operating on a plurality of computing devices; executing a clustering algorithm on the received data; identifying at least one cluster based at least in part on executing the clustering algorithm; identifying an existence of an anomalous event associated with the scripting utility based at least in part on executing the clustering algorithm; and transmitting an indication of the anomalous event to an administrator.

19 Claims, 7 Drawing Sheets

(56) References Cited

U.S. PATENT DOCUMENTS

| | | | | |
|---|---|---|---|---|
| 2014/0032506 | A1* | 1/2014 | Hoey | G06F 16/215 |
| | | | | 707/691 |
| 2015/0033084 | A1* | 1/2015 | Sasturkar | G06F 11/0709 |
| | | | | 714/46 |
| 2015/0128263 | A1* | 5/2015 | Raugas | H04L 63/1408 |
| | | | | 726/23 |
| 2015/0212869 | A1* | 7/2015 | Chen | G06F 11/0706 |
| | | | | 714/38.1 |
| 2016/0328654 | A1* | 11/2016 | Bauer | G06N 5/048 |
| 2017/0099304 | A1* | 4/2017 | Anderson | H04L 63/1416 |
| 2017/0124478 | A1* | 5/2017 | Baradaran | G06N 99/005 |
| 2017/0230410 | A1* | 8/2017 | Hassanzadeh | H04L 63/1441 |
| 2018/0069981 | A1* | 3/2018 | Pekarske | H04N 1/32793 |
| 2018/0183824 | A1* | 6/2018 | Chen | H04L 63/1425 |
| 2018/0196942 | A1* | 7/2018 | Kashyap | G06F 21/56 |
| 2018/0212985 | A1* | 7/2018 | Zadeh | H04L 63/1425 |
| 2018/0219919 | A1* | 8/2018 | Crabtree | H04L 63/1441 |

OTHER PUBLICATIONS http://info.prelert.com/blog/detecting-malware-free-intrusions-and-advanced-cyber-threats-with-anomaly-detectionand-behavioral-md5-of-endpoint-processes, posed by Oleg Kolesnikov on Feb. 29, 2016.
https://www.fireeye.com/blog/threat-research/2015/12/uncovering_activepower.html, by Ankit Anubhav and Raghav Ellur, Dec. 14, 2015.
https://www.blackhat.com/docs/us-14/materials/us-14-Kazanciyan-Investigating-Powershell-Attacks-WP.pdf, by Ryan Kazanciyan and Matt Hastings, 2014.
http://www.secbi.com/product/; Stop Chasing Anomalies and Alerts, Design by David Luria, 2015.

* cited by examiner

| Instances 305 | Cluster 310 | Suspicion Rank 315 | Average Rep. # 325 | % of Rep. # 330 | # Unique Hashes 335 | Instance File Ratio 340 | Unique Machine IDs 345 |
|---|---|---|---|---|---|---|---|
| Parent process is in Appdata\Local\Temp + no suspicious options 355 | 1 | Medium | 23.76923/ -15.29412 | 15.29412/ 57.64706/ 27.05882 | 2/20/12 | 6.5/2.45/1.916667 | 25 |
| Parent process is in Appdata\Local\Temp + AV Scanner 360 | 0 | High | 108.48665/ -40.0869 | 2.744807/ 96.51335/ 0.74184 | 2/130/8 | 18.5/10.00769/1.25 | 172 |
| Parent Process is in Appdata\Local\Temp + retrieves Win32_OperatingSystem properties 365 | 4 | High | 0/ -46.6 | 0/50.84746/ 49.15254 | 0/14/12 | 0/2.142857/2.416667 | 21 |
| Execution Policy = Bypass + EncodedCommand 370 | 2 | Low | 22/0 | 100/0/0 | 7/0/0 | 39605/0/0 | 2 |
| Bypasses Execution Policy+Window is Hidden 375 | 6 | Medium | 64.61229/0 | 100/0/0 | 1/0/0 | 0/0/16 | 16 |

BEHAVIORAL ANALYSIS OF SCRIPTING UTILITY USAGE IN AN ENTERPRISE

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors.

The wide-spread use of computers and mobile devices has caused an increased presence of malicious programs such as rootkits, spyware, trojans, and the like. Malware programmers are continually adapting to the improvements made in malware detection, which creates an ongoing cycle of malware techniques adapting to improvements in malware detection.

SUMMARY

According to at least one embodiment, a method for behavioral analysis of scripting utility usage in an enterprise is described. In one embodiment, the method describes receiving, by a processor, data associated with execution of a scripting utility operating on a plurality of computing devices; executing, by the processor, a clustering algorithm on the received data; identifying, by the processor, at least one cluster based at least in part on executing the clustering algorithm; identifying, by the processor, an existence of an anomalous event associated with the scripting utility based at least in part on executing the clustering algorithm; and transmitting, by the processor, an indication of the anomalous event to an administrator. The plurality of computing devices may be associated with a single enterprise. In some embodiments, the anomalous event may be determined to be an anomaly across the plurality of computing devices.

In some embodiments, receiving may further include receiving data continuously over a pre-determined period of time. Receiving may further include receiving data related to at least one of prevalence of command line usage, frequency of use, how the scripting utility is launched, time of invocation of the scripting utility, information related to access to remote internet protocol (IP) addresses, or any combination thereof In some embodiments, identifying the existence of the anomalous event may include analyzing historical data received by the processor associated with execution of the scripting utility. In some embodiments, executing the clustering algorithm may further include executing a density-based spatial clustering algorithm. Identifying the existence of the anomalous event may further include analyzing historical data received by the processor associated with execution of the scripting utility.

The method may further include calculating a risk score associated with the anomalous event based at least in part on identifying the existence of the anomalous event. Calculating the risk score may further include applying a scoring formula to the anomalous event based at least in part on properties associated with the at least one cluster.

The method may further include receiving feedback from the administrator regarding a confidence level of the anomalous event. The method may further include analyzing a set of behaviors associated with at least one cluster. Analyzing may also include determining a relationship of data that compose at least one cluster. Analyzing may further include applying a set of rules associated with previously determined behavior to the at least one cluster, the previously determined behavior determined by an administrator. The previously determined behavior may be malicious behavior, such as malware behavior. Analyzing may further include calculating a set of properties associated with the at least one cluster.

A computing device configured for behavioral analysis of scripting utility usage in an enterprise is described. The computing device may include a processor and memory in electronic communication with the processor. The memory may store computer executable instructions that when executed by the processor cause the processor to perform the steps of receiving data associated with execution of a scripting utility operating on a plurality of computing devices; executing a clustering algorithm on the received data; identifying at least one cluster based at least in part on executing the clustering algorithm; identifying an existence of an anomalous event associated with the scripting utility based at least in part on executing the clustering algorithm; and transmitting an indication of the anomalous event to an administrator.

A non-transitory computer-readable storage medium storing computer executable instructions is also described. When the instructions are executed by a processor, the execution of the instructions may cause the processor to perform the steps of receiving data associated with execution of a scripting utility operating on a plurality of computing devices; executing a clustering algorithm on the received data; identifying at least one cluster based at least in part on executing the clustering algorithm; identifying an existence of an anomalous event associated with the scripting utility based at least in part on executing the clustering algorithm; and transmitting an indication of the anomalous event to an administrator.

In some cases, malware programmers are increasingly turning to misuse of legitimate scripting utility business tools such as POWERSHELL®, Windows Management Instrumentation (WMI), PsExec, etc., in order to breach an organization. Problems arise due to the fact that administrators and safe applications may rely on these tools for legitimate uses. Existing solutions may look at specific commands which have previously determined to be suspicious or malicious. Other existing solutions may look at individual instances of scripting utility use to identify maliciousness, such as look for a command line option such as "-Encoded" and flagging identified command lines as suspicious. In such cases, the solution may be prone to false positives as suspicious looking command lines may be used by a legitimate application as well. Other existing solutions may focus on detecting a deviation of process use from previously determined baseline behavior on a single machine; however, these previous solutions focus only on a single client, and what may look abnormal on a single client may be normal uses across multiple machines.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to behavioral analysis of scripting utility usage in an enterprise. More specifically, the systems and methods described herein relate to behavioral analysis in relation to taking steps to prevent malicious control or attacks on computing devices. In some embodiments, companies and/or enterprise may utilize software to automate administrative tasks and to manage client machines. For example, an enterprise may utilize a scripting utility, such as PowerShell® from Microsoft Corporation ("PowerShell"), to perform administrative tasks. For purposes of the description, PowerShell is described as the scripting utility, however, the methods and systems described herein may relate to any scripting utility and are not solely limited by PowerShell.

In some embodiments, administrators of an enterprise may perform administrative tasks on both local and remote operating systems. Administrative tasks may be performed by command-line entries (e.g., "cmdlets"), which may be .NET classes implementing an operation. Command-line entries may be combined into scripts and/or executables (i.e., standalone applications). In addition, scripting utilities like PowerShell may provide a hosting application programming interface (API) with which the scripting utility runtime may be embedded within other applications. These other applications may then use PowerShell scripting functionality to implement certain operations, including by way of a graphical user interface (GUI).

Multiple computers may use a scripting utility within a single enterprise, with each computer or with multiple smaller groups of computers using the scripting utility in different ways and for different purposes; thus, it can be difficult to differentiate between legitimate uses of the scripting utility and malicious uses of the scripting utility since the utility is not being used the same way or with the same predictability across the entire enterprise. For example, an enterprise may have, among others, two departments: a human resources (HR) department and a legal department, which each department using a plurality of computers networked together, and any of the plurality of computers across both departments may be running the scripting utility. In one embodiment, the scripting utility may be used in a way specific to the needs of the HR department, using legitimate, specific, expected, and/or common command lines. In contrast, the legal department may use the scripting utility in a legitimate and expected way as well; however, the command lines used may be different than those for HR. In a two-computer comparison between a computer associated with the HR department and the legal department, a script received from a legal department computer may look like an anomaly and flagged as malware when compared to scripts used by the HR department. However, in a comparison of scripts used across the enterprise as a whole, the legal department script may be whitelisted. Thus, in order to detect malicious uses of the scripting utility, software may receive data and execute clustering algorithms to analyze the scripting utility usage across the enterprise as a whole, and determine legitimate versus abnormal and/or malicious uses (e.g., a script that has never been used across all of the plurality of computers associated with the enterprise).

In one embodiment, a plurality of computing devices may be networked together within an enterprise, and data related to scripting usage may be received by a remote computing system such as a related server. The server may be remotely located or may be on-premises, and may receive (and in some cases record) attributes for each scripting utility instance during a pre-determined period of time. Attributes which may be received and/or recorded may include, but are not limited to, command lines used, which process launched the scripting utility, the path of the launching process, the directory of the scripts used, whether the utility was accessed remotely, if there is an associated antivirus application, use of remote Internet Protocol (IP) access, the first run script and/or command line, the last run script and/or command line, the user account from which the scripting utility is launched, etc. Received attributes may be used to analyze the scripting utility usage across the entire enterprise (or across a pre-determined group) by way of applying clustering algorithms to determine anomalies which may indicate malicious usage.

Figure 1:
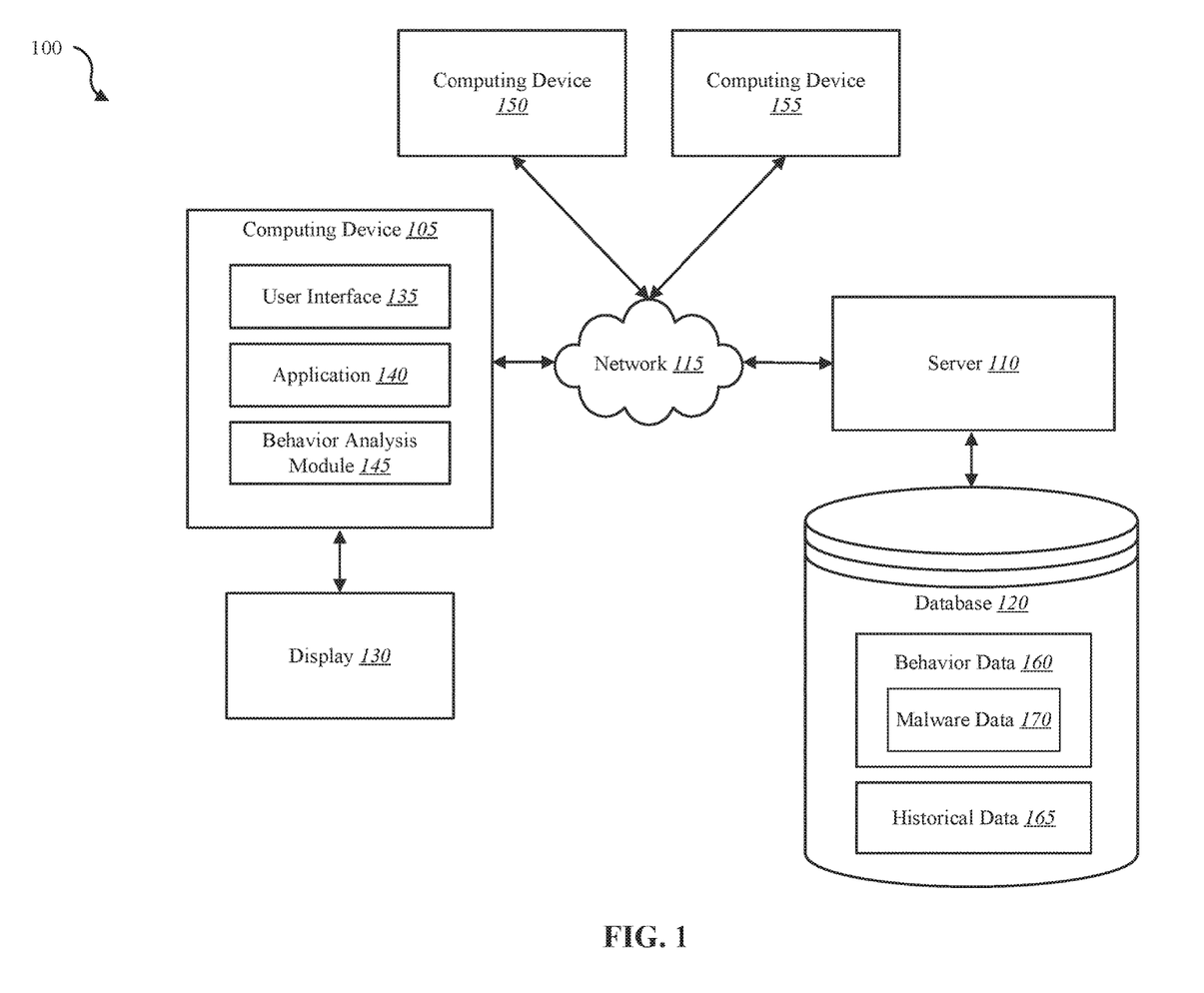
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed on a single device (e.g., computing device 105) and/or on a plurality of devices (e.g., computing devices 105, 150, and/or 155). As depicted, the environment 100 may include a computing device 105, server 110, a display 130, a computing device 150, an computing device 155, and a network 115 that allows the devices 105, 150, and/or 155, the server 110 to communicate with one another.

Examples of the computing devices 105, 150, and 155 may include any combination of mobile devices, smart phones, personal computing devices, computers, laptops, desktops, servers, media content set top boxes, digital video recorders (DVRs), or any combination thereof. Any combination of computing devices 105, 150, and 155, as well as additional computer devices not shown, may be part of a plurality of computing devices which are associated with a single enterprise. In some embodiments, the enterprise may be a business operating from single location, multiple locations, a single building, multiple buildings, etc. The plurality of computing devices may represent all of, or a subset of, all of the computing devices associated with the enterprise. In other embodiments, the plurality of computing devices may be associated with a single location, a specific department, or any other association selected.

Examples of server 110 may include any combination of a data server, a cloud server, a server associated with an enterprise, including a proxy server, mail server, web server, application server, database server, communications server, file server, home server, mobile server, name server, or any combination thereof.

In some configurations, the computing devices 105, 150, and/or 155 may include a user interface 135, application 140, and a behavior analysis module 145. For ease of discussion, in some cases, computing device 105 may be considered representative of computing devices 150 and/or 155. Although the components of representative computing device 105 are shown to be internal, it is understood that one or more of the components may be external to the device 105 and connect to computing device 105 through wired and/or wireless connections. In some embodiments, application 140 may be installed on computing devices 150 and/or 155 in order to allow a user to interface with functions of computing devices 105, 150 and/or 155, behavior analysis module 145, and/or server 110.

In some embodiments, computing device 105 may communicate with server 110 via network 115. Computing device 105 may also communication with computing devices 150 and/or 155 via network 115. Examples of network 115 may include any combination of cloud networks, local area networks (LAN), wide area networks (WAN), virtual private networks (VPN), wireless networks (using 802.11, for example), cellular networks (using 3G, 4G, 5G and/or Long-Term Evolution (LTE), for example), etc. In some configurations, the network 115 may include the Internet. It is noted that in some embodiments, the computing device 105 may not include a behavior analysis module 145. For example, device 105 may include application 140 that allows device 105 to interface with a plurality of other computing devices (e.g., computing devices 150 and/or 155), network 115, server 110 and/or database 120 via behavior analysis module 145. In some embodiments, computing devices 105, 150, and/or 155 and server 110 may include a behavior analysis module 145 where at least a portion of the functions of behavior analysis module 145 are performed separately and/or concurrently on devices 105, 150, and/or 155, and/or server 110. Likewise, in some embodiments, a user may access the functions of representative computing device 105 from computing devices 150 and/or 155, or vice versa. For example, in some embodiments, computing devices 105, 150, and/or 155 may include a mobile application that interfaces with one or more functions of the other computing devices of the plurality of computing devices, behavior analysis module 145, and/or server 110.

In some embodiments, server 110 may be coupled to database 120. Database 120 may be internal or external to the server 110. In one example, device 105 may be coupled directly to database 120, database 120 being internal or external to computing device 105, 150, and/or 155. Database 120 may include behavior data 160 and/or historical data 165. In addition, behavior data may include malware data 170. Although not shown, historical data 165 may also include malware data. For example, representative device 105 may access behavior data 160 in database 120 over network 115 via server 110. Behavior data 160 may include data regarding the times the scripting utility is activated, the amount of time the scripting utility is being used from activation time until exit, the prevalence of use, the directly location of the scripting utility scripts, command line options, access to external Uniform Resource Locators (URLs), the process used to invoke the command line, the actual command lines being used, etc. Malware data 170 may include data related to attributes associated with known types of malware and/or attributes likely to be associated with malware. Historical data 165 may include data regarding previously analyzed scripting utility usage, clustering data, and/or malware data.

Behavior analysis module 145 may enable administration of a plurality of computers associated with an enterprise to determine whether a scripting utility is being used maliciously by focusing on historical usage of the scripting utility across the entire enterprise, as opposed to at a single computer.

In some embodiments, behavior analysis module 145 may be configured to perform the systems and methods described herein in conjunction with user interface 135 and application 140. User interface 135 may enable a user to interact with, control, and/or program one or more functions of behavior analysis module 145. Further details regarding the behavior analysis module 145 are discussed below.

Figure 2:
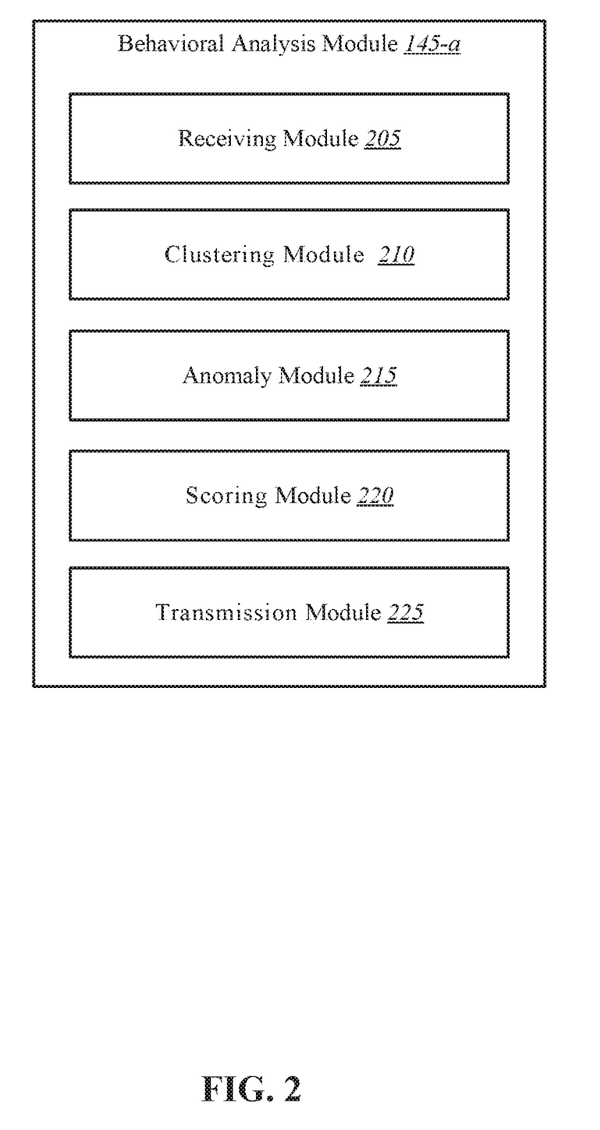
FIG. 2 is a block diagram illustrating one example of a behavioral analysis module.

FIG. 2 is a block diagram illustrating one example of a behavioral analysis module 145-a. Behavioral analysis module 145-a may be one example of behavioral analysis module 145 depicted in FIG. 1. As depicted, behavioral analysis module 145-a may include receiving module 205, clustering module 210, anomaly module 215, scoring module 220, and transmission module 225.

In one embodiment, receiving module 205 is configured to receive data associated with the execution of a scripting utility operating on a plurality of computing devices. The plurality of computing devices may be, for example, a number of computers associated with a single business or enterprise. The plurality of computers may represent computers within a single business, multiple offices associated with a single business, a single department within a business, multiple departments within a business, etc.

In some embodiments, the data may be received continuously over a pre-determined period of time, such as an hour, throughout a workday, over a week or a month, etc. In an embodiment, the data may be received through an on-client agent that triggers an event to receive and/or record the data each time it is determined the scripting utility is being used. In some embodiments, the data received may include, but is not limited to, the prevalence of a usage of a specific command line, the frequency the scripting utility is used, the frequency a command line is used, how the scripting utility was launched, the time of invocation of the scripting utility, information related to access to remote internet protocol (IP) addresses, the time and/or days the scripting utility is launched, the direction location of the scripting utility script or any combination thereof. For each instance for which data related to use of scripting utility is received and/or recorded, a processing engine automatically (e.g., associated with the server 110) may extract these features and/or attributes from not just a single computing device, but from a plurality of computing devices associated with the enterprise. In some embodiments, what features and/or attributes extracted, received, and/or recorded are determined by an administrator. In other embodiments, the processing engine (e.g., the receiving module 205) may learn what features and/or attributes are most reliable or most useful over time, and automatically determine what to extract, receive and/or record as a result.

In one embodiment, receiving and recording features and/or attributes related to scripting utility usage is used to automatically learn what is normal and/or expected usage of the scripting utility across the enterprise over a period of time. In automatically learning what is normal and/or expected, it is also determined what is an abnormal or suspicious usage of the scripting utility over time. In order to determine what usage is normal and/or abnormal, the received data may be analyzed by executing an algorithm which clusters together similar instantiations of the scripting utility and highlights outlier and/or anomalous usage.

In one embodiment, clustering module 210 is configured to execute a machine learning technique, such as a clustering algorithm, on the received data. For example, clustering may be enabled to determine a structure or a relationship within a collection of otherwise unassociated data. The cluster may comprise a collection of data which shares a similarity with other data in the cluster, and shares a dissimilarity with data not in the cluster. The clustering module 210 may enable cluster which does not limit the number of clusters, but rather recognizes outliers, such as a density-based spatial scan. Other clustering algorithms may include, but are not limited to, K-means, Bradley-Fayyad-Reina, Fuzzy C-means, Hierarchical clustering, Gaussian clustering, and the like.

Clustering features may include, for example, parent file reputation, the parent file name is among known good files, the parent file name is a specifically known trademark or software, the command line is hidden, the command line has a bypass, the command line is encoded, the command lines has base 64 encoding, the command line is remotely signed, the command line is unrestricted, the command line is shell executed, the command line was executed from a remote IP; etc.

For each cluster that the clustering module 210 determines, an automated process may be executed that summarizes the behavioral properties of each determined cluster. For example, the behavioral properties may include, but are not limited to, a cluster label, a statistic derivation, applications of user policies, a risk score, or any combination. A cluster label may indicate why each determined instance is clustered together. For example, a cluster may represented all instances identified as "execution police is unrestricted+ Window is hidden+AV scanner on system." A statistic derivation may be used to calculate cluster properties, such as determining the median and/or average reputation of the process used to invoke the scripting utility, the prevalence of usage of the scripting utility or a specific script and/or command line, access to remote URLs, and/or detection of potentially malicious code or behaviors. In addition, the clustering module 210 may recognize or determine the application of pre-determined user policies. For example, data provided by an administrator may be directed to previously defined and/or expected behavioral properties of legitimate versus malicious scripting utility usage including, but not limited to, whitelisted versus blacklisted processes, script directors, URLs, and the like. Each cluster may therefore be examined for the presence of instances that match administrator defined whitelisted and/or blacklisted policies.

Each cluster that the clustering module 210 determines and the associated features and/or attributes may be transmitted to or displayed to an administrator. In some embodiments, the cluster may be provided to the administrator each time a cluster is determined; however, in other embodiments, the cluster (and its features and/or attributes) may be provided to the administrator only if the cluster is flagged as being a potential anomaly and/or risk.

In one embodiment, anomaly module 215 is configured to identify an existence of an anomalous event associated with the scripting utility based at least in part on executing the clustering algorithm. In some examples, a potential anomaly and/or risk may be determined if the scripting utility is being used in a new way across the enterprise (not just a new way on a single computer or within a single department). Anomalies may be determined based on historical usage analysis and factors such as the time between script usage, the number of instances over a pre-determined time period, how many machines have run the script, etc.

The anomaly module 215 may further identify the existence of the anomalous event by analyzing historical data associated with execution of the scripting utility. In some embodiments, the anomalous event may be an event that is determined to be an anomaly across the plurality of computing devices as opposed to an anomaly at one computing device.

In one embodiment, the scoring module 220 may be configured to calculate a risk score associated with the anomalous event based at least in part on identifying the existence of the anomalous event. Calculating the risk score may include applying a scoring formula to the anomalous event based at least in part on properties associated with the identified cluster. In one example, statistic derivation and/or application of user properties may be combined or analyzed by applying a scoring formula which may be used to calculate a risk score. The risk score may indicate a level of suspiciousness as to whether a cluster and/or an attribute of a cluster or a process may be malicious (i.e., clusters being assigned a high risk score have a higher likelihood of being malicious). In some examples, behaviors and/or attributes determined to be outliers, or behaviors and/or attributes that appear less frequently across a plurality of different computers across the enterprise are more likely to have higher risk scores, and thus are more likely to be flagged as malicious.

In one embodiment, the transmission module 225 may be configured to transmit an indication of an anomalous event to an administrator. For example, an administrator may be notified for each new anomalous instantiation observed. In some embodiments, the administrator may provide feedback on the received data. For example, the administrator may note whether received features and/or attributes are malicious or benign. The administrator may further provide feedback and/or information on the behavior of a cluster or provide a ranking or risk score to a feature, attribute, and/or cluster. Administrator feedback may be used to continuously improve the performance of the clustering process and improve the computer learning algorithms used to perform clustering.

Figure 3:
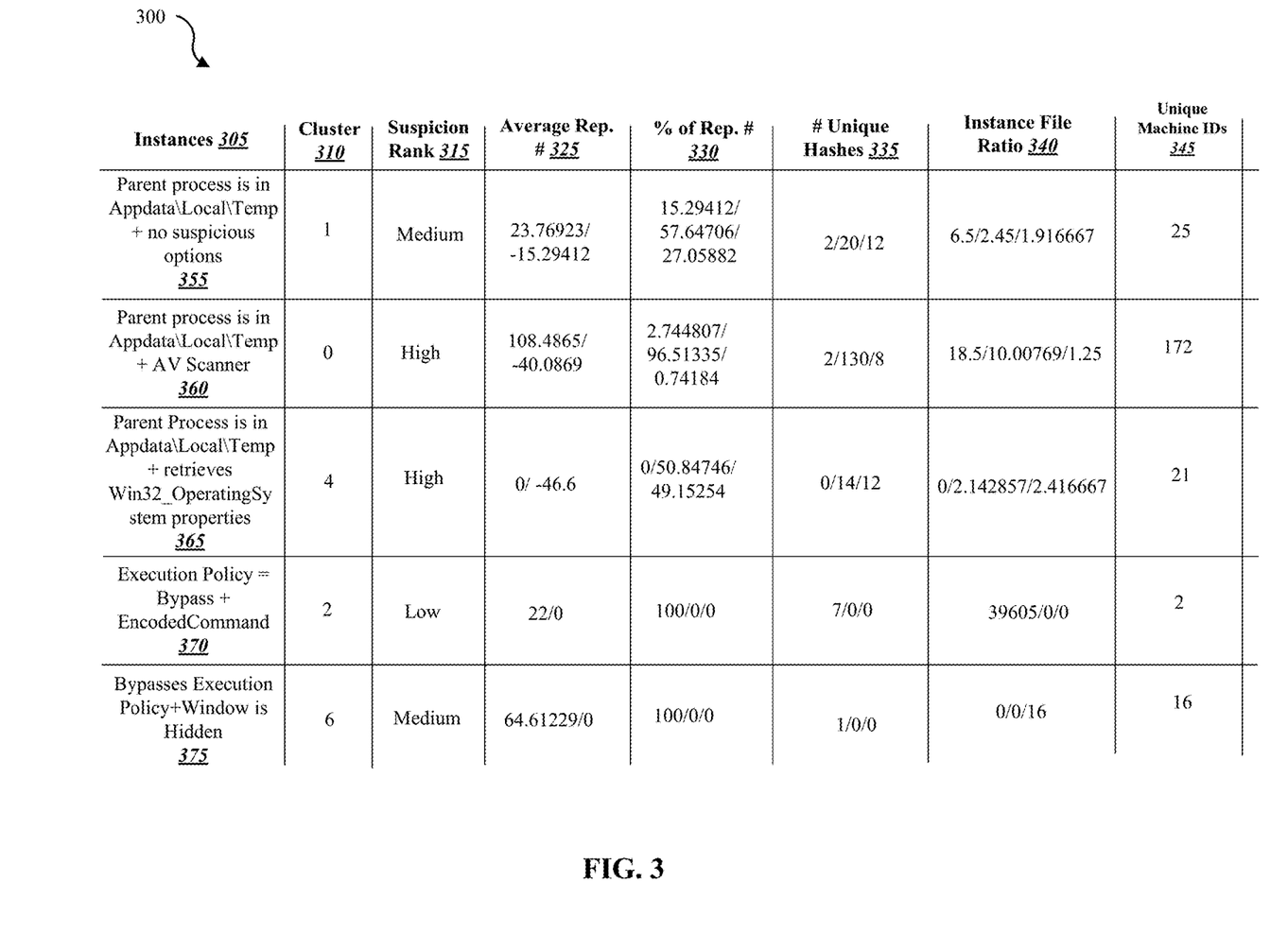
FIG. 3 is an example of database illustrating one example of data related to behavioral analysis of scripting utility usage in an enterprise.

FIG. 3 is a spreadsheet illustrating one example of an spreadsheet 300 for behavioral analysis of scripting utility usage in an enterprise. As depicted, example spreadsheet 300 shows a collection of received data related to scripting utility usage. The spreadsheet 300 may contain data related to, but not limited to, a collection or cluster of scripting utility instances of column 305 (e.g., the command line, script, module, etc.), a cluster label 310, a suspicion rank 315, an average reputation number 325, the percentage of good, bad, and unknown reputation numbers 330, the number of unique hashes 335, an instance file ratio 340, and the number of unique machine identifications running a script as shown in column 345.

Row 355, 360, 365, 370, and 375 may be examples of clusters of scripting utility instances or processes for which data is received across a plurality of computers. Looking at row 370, it may be determined that a cluster of processes or instances of the scripting utility are common enough to be collected together in a cluster described as "Execution Policy=Bypass+EncodedCommand." In one example, "execution policy=Bypass+EncodedCommand" may indicate that the scripting utility instances which are part of the cluster of row 370 had a scripting utility command line with "Execution Policy" as a bypass and used the "-encoded" command line option. Through clustering and analysis, the cluster of instances shown in row 370 may be assigned to cluster 2 as shown in column 310. Based on the number of instances of the process run, the number of machines, other analysis, etc., the process may be given a low suspicion rank 315.

For each example cluster of instances shown in column 305, each cluster may be assigned an average reputation, as shown in column 325. For example, Process A may invoke Instance 1, and Process B may invoke Instance 2, where Instance 1 and Instance 2 together make up cluster 2, shown in row 370. Thus, the method may analyze the reputation of Process A and the reputation of Process B and determine average reputations for Process A and Process B.

In one embodiment, the average reputation may be determined, in part, by a percentage of good/bad/unknown reputation scores for each process as shown in example column 325. The average reputation may be an average of the reputations of the parent process. More specifically, looking at the percentage of reputation scores for the cluster of instances of row 375, the percentage of good/bad/unknown processes may be 100 good, 0 bad, and 0 unknown.

Column 330 may show the percentage split of parent processes of scripting utility executions in the associated cluster that have good, bad, and unknown reputations, respectively. Moving to column 335, in analyzing whether there is an anomaly of scripting utility usage, the method may also consider, for example, the number of unique hashes shown in column 335. For example, if Process A and Process B invoke the scripting utility, and if Process A and Process B are completely different processes, Process A and Process B will have unique file hashes. For each cluster, the method may look at the unique hashes to determine whether each invocation of the scripting utility occurs because of a single process or multiple processes. For example, 100 processes may invoke the scripting utility, but when analyzed, it may be determined that only 5 unique processes invoke the scripting utility, each process making 20 example invocations.

Column 340 may indicate the instance/file ratio. For example, the method may analyze how many instances were invoked by a number of good/bad/and/or unknown files. Other data that may be analyzed to determine an anomaly of scripting utility usage across an enterprise may be based on the number of unique machine identifiers, as shown in column 345. For example, the method may determine how many scripting utility instances were invoked on how many unique machines. Thus, the method may look at the number of unique machines which contributed to a cluster of instances.

Although FIG. 3 shows a variety of data examples which may be used to determine anomalies of scripting utility usage across an enterprise, the methods and systems described herein are not limited to this data or these examples.

Figure 4:
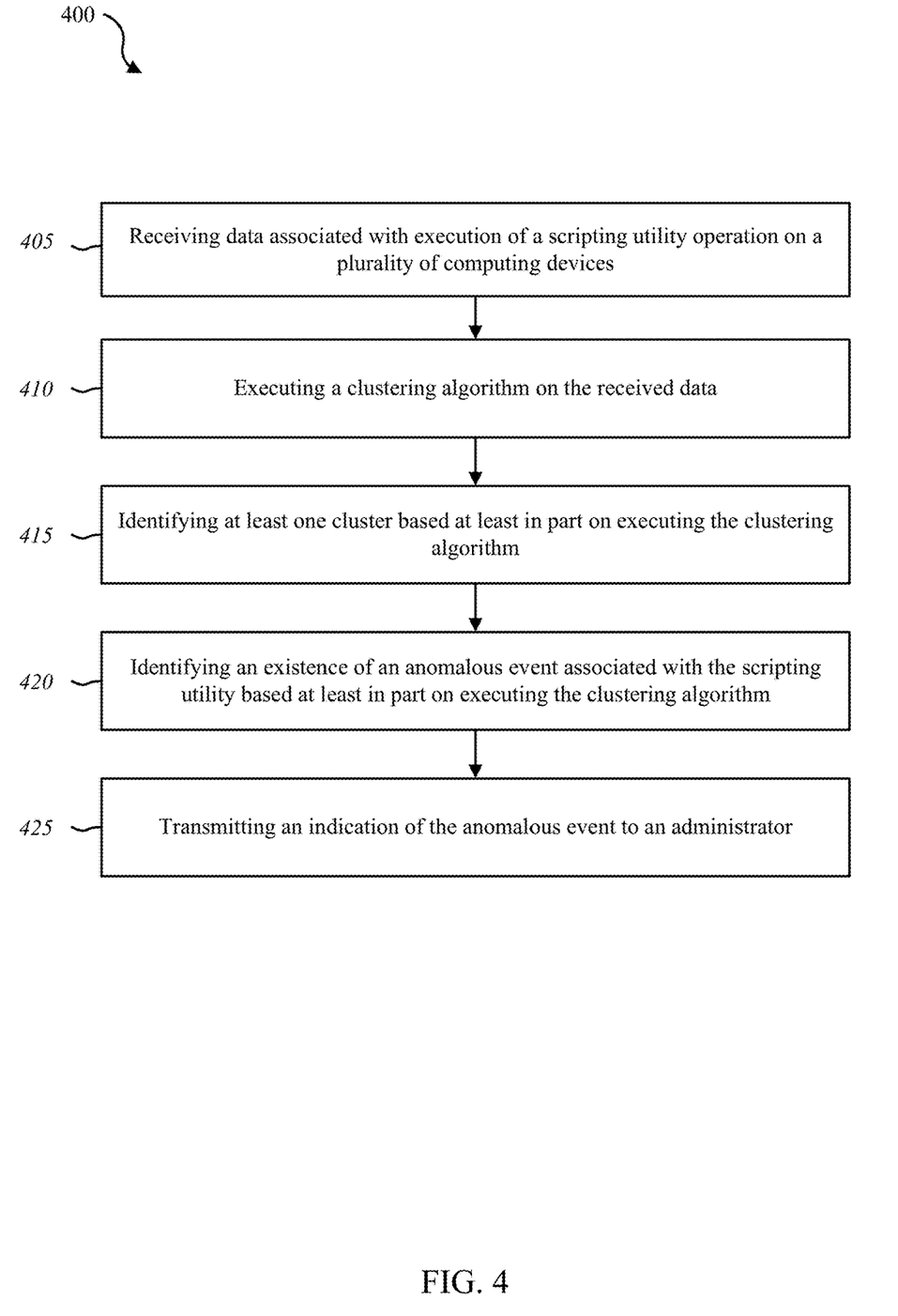
FIG. 4 is a flow diagram illustrating one embodiment of a method for behavioral analysis of scripting utility usage in an enterprise.

FIG. 4 is a flow diagram illustrating one embodiment of a method 400 for behavioral analysis of scripting utility usage in an enterprise. In some configurations, the method 400 may be implemented by the behavioral analysis module 145 illustrated in FIGS. 1, 2, 6, and/or 7. In some configurations, the method 400 may be implemented in conjunction with the application 140 and/or the user interface 135 illustrated in FIG. 1.

At block 405, the method may include receiving data associated with execution of a scripting utility operation on a plurality of computing devices. In some example embodiments, receiving module 205 may implement the step described in block 405.

At block 410, the method may include executing a clustering algorithm on the received data. At block 415, the method may include identifying at least one cluster based at least in part on executing the clustering algorithm. In some example embodiments, clustering module 210 may implement the steps described in block 410 and/or 415.

At block 420, the method may include identifying an existence of an anomalous event associated with the scripting utility based at least in part on executing the clustering algorithm. In some example embodiments, anomaly module 215 may implement the step described in block 420.

At block 425, the method may include transmitting an indication of the anomalous event to an administrator. In some example embodiments, transmission module 225 may implement the step described in block 425.

Figure 5:
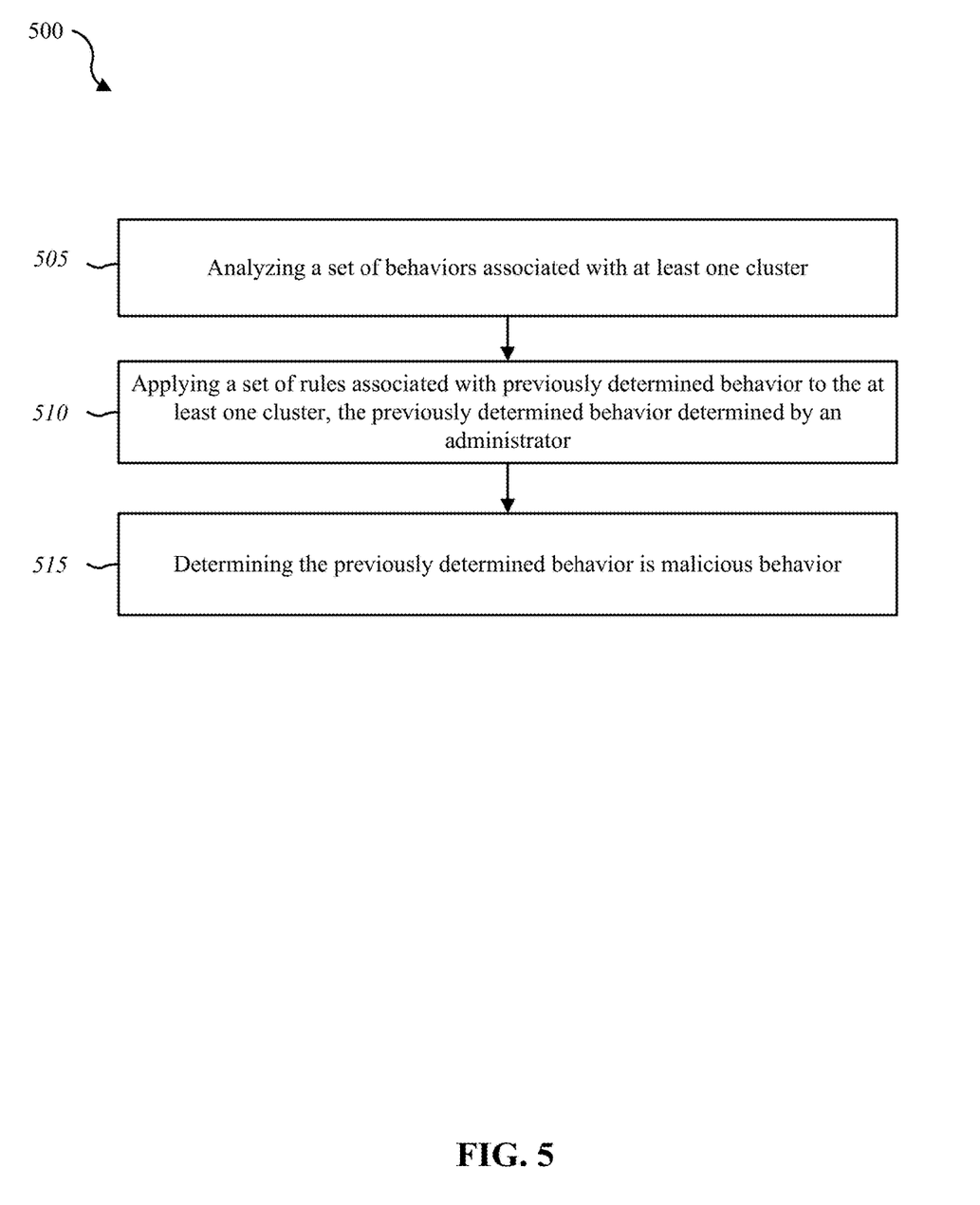
FIG. 5 is a flow diagram illustrating one embodiment of a method behavioral analysis of scripting utility usage in an enterprise.

FIG. 5 is a flow diagram illustrating one embodiment of a method 500 for behavioral analysis of scripting utility usage in an enterprise. In some configurations, the method 500 may be implemented by the behavioral analysis module 145 illustrated in FIGS. 1, 2, 6, and/or 7. In some configurations, the method 500 may be implemented in conjunction with the application 140 and/or the user interface 135 illustrated in FIG. 1.

At block 505, the method may include analyzing a set of behaviors associated with at least one cluster. In some example embodiments, anomaly module 215 and/or scoring module 220 may implement the step described in block 505.

At block 510, the method may include applying a set of rules associated with previously determined behavior to the at least one cluster, the previously determined behavior determined by an administrator. At block 515, the previously determined behavior may be determined to be malicious behavior. In some example embodiments, anomaly module 215 and/or scoring module 220 may implement the steps described in block 510 and/or 515.

Figure 6:
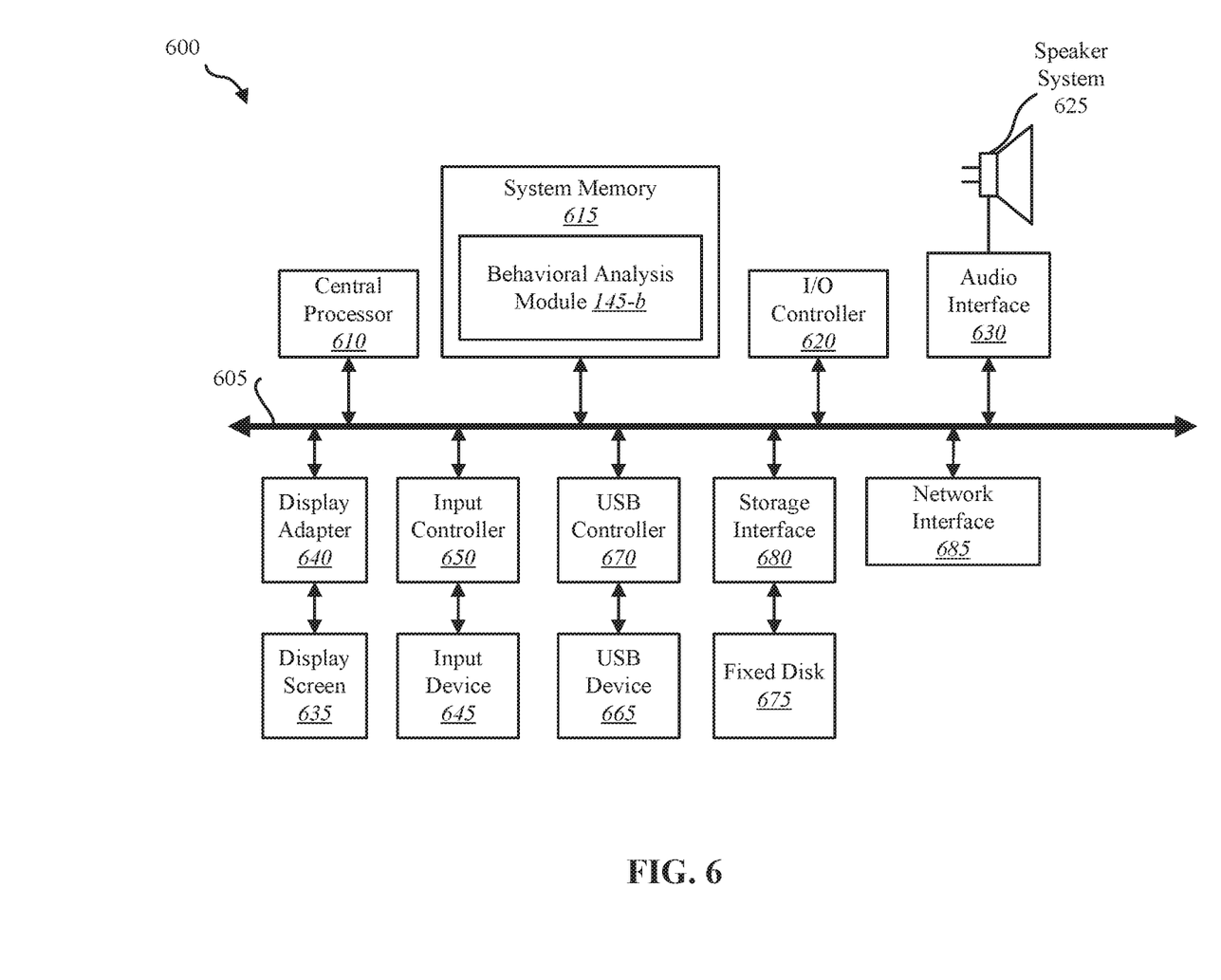
FIG. 6 depicts a block diagram of a computer system suitable for implementing the present systems and methods.

FIG. 6 depicts a block diagram of a computing device 600 suitable for implementing the present systems and methods. The device 600 may be an example of device 105, computing device 150, computing device 155, and/or server 110 illustrated in FIG. 1. In one configuration, device 600 includes a bus 605 which interconnects major subsystems of device 600, such as a central processor 610, a system memory 615 (typically random access memory (RAM), but which may also include read only memory (ROM), flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple universal serial bus (USB) devices 665 (interfaced with a USB controller 670), and a storage interface 680.

Bus 605 allows data communication between central processor 610 and system memory 615, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the behavior analysis module 145-b may be stored within the system memory 615. Applications (e.g., application 140) resident with device 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of device 600, can connect to a standard computer readable medium for storage and/or retrieval of information, such as a fixed disk drive 675. Fixed disk drive 675 may be a part of device 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on device 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 600 may include wireless communication signals such as radio frequency, electromagnetics, local area network (LAN), wide area network (WAN), virtual private network (VPN), wireless network (using 802.11, for example), cellular network (using 3G, 4G, 5G and/or LIE, for example), and/or other signals. The network interface 680 may enable one or more of wireless wide area network (WWAN) (global system for mobile (GSM), code division multiple access (CDMA), and wideband code division multiple access (WCDMA), WLAN (including BLUETOOTH® and Wi-Fi), WMAN (WiMAX) for mobile communications, antennas for Wireless Personal Area Network (WPAN) applications (including radio frequency identification (RFID) and ultra-wide band (UWB)), etc.

The I/O controller 620 may operate in conjunction with network interface 685 and/or storage interface 680. The network interface 685 may enable system 600 with the ability to communicate with client devices (e.g., devices 105, 150, and/or 155 of FIG. 1), and/or other devices over the network 115 of FIG. 1. Network interface 685 may provide wired and/or wireless network connections. In some cases, network interface 685 may include an Ethernet adapter or Fibre Channel adapter. Storage interface 680 may enable system 600 to access one or more data storage devices. The one or more data storage devices may include two or more data tiers each. The storage interface 680 may include one or more of an Ethernet adapter, a Fibre Channel adapter, Fibre Channel Protocol (FCP) adapter, a small computer system interface (SCSI) adapter, and iSCSI protocol adapter.

Figure 7:
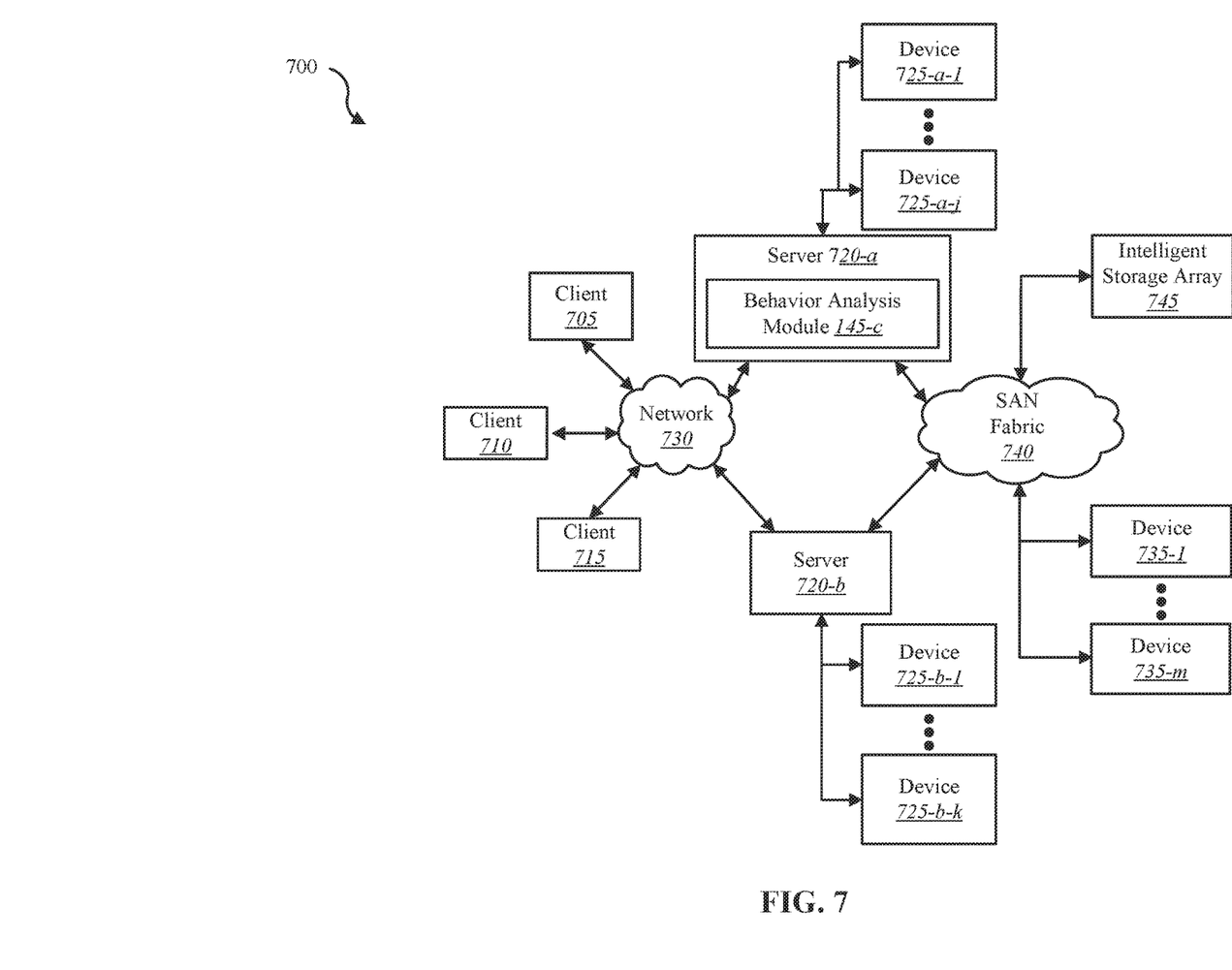
FIG. 7 depicts a block diagram of a computer system suitable for implementing the present systems and methods.

FIG. 7 is a block diagram depicting a network architecture 700 in which client systems 705, 710 and 715, as well as storage servers 720-a and 720-b (any of which can be implemented using computer system 600), are coupled to a network 730. In one embodiment, behavioral analysis module 145-c may be located within one of the storage servers 720-a, 720-b to implement the present systems and methods. Behavioral analysis module 145-c may be one example of behavioral analysis module 145 depicted in FIGS. 1, 2, and/or 6. The storage server 720-a is further depicted as having storage devices 725-a-1 through 725-a-j directly attached, and storage server 720-b is depicted with storage devices 725-b-1 through 725-b-k directly attached. SAN fabric 740 supports access to storage devices 735-1 through 735-m by storage servers 720-a and 720-b, and so by client systems 705, 710 and 715 via network 730. Intelligent storage array 745 is also shown as an example of a specific storage device accessible via SAN fabric 740.

With reference to computer system 600, network interface 685 or some other method can be used to provide connectivity from each of client computer systems 705, 710 and 715 to network 730. Client systems 705, 710 and 715 are able to access information on storage server 720-a or 720-b using, for example, a web browser or other client software (not shown). Such a client allows client systems 705, 710 and 715 to access data hosted by storage server 720-a or 720-b or one of storage devices 725-a-1 to 725-a-j, 725-b-1 to 725-b-k, 735-1 to 735-m or intelligent storage array 745. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method of behavioral analysis, comprising:
   receiving, by a processor, data associated with execution of a scripting utility operating on a plurality of computing devices;
   executing, by the processor, a clustering algorithm on the received data;
   identifying, by the processor, at least a first cluster corresponding to a first subset of the plurality of computing devices that execute a first usage of the scripting utility and a second cluster corresponding to a second subset of the plurality of computing devices that execute a second usage of the scripting utility that is different from the first usage of the scripting utility based at least in part on executing the clustering algorithm;
   identifying, by the processor, an existence of an anomalous event associated with the scripting utility based at least in part on executing the clustering algorithm, identifying the existence of the anomalous event including determining the anomalous event is an anomaly with respect to each computing device of the first subset of computing devices that execute the first usage of the scripting utility and the second subset of computing devices that execute the second usage of the scripting utility; and
   transmitting, by the processor, an indication of the anomalous event to an administrator.

2. The method of claim 1, wherein receiving further comprises:
   receiving data continuously over a pre-determined period of time.

3. The method of claim 1, wherein identifying the existence of the anomalous event further comprises:
   analyzing historical data received by the processor associated with the execution of the scripting utility.

4. The method of claim 1, wherein receiving data further comprises:
   receiving data related to at least one of prevalence of command line usage, frequency of use, how the scripting utility is launched, time of invocation of the scripting utility, information related to access to remote internet protocol addresses, or any combination thereof.

5. The method of claim 1, wherein executing the clustering algorithm further comprises:
   executing a density-based spatial clustering algorithm.

6. The method of claim 1, further comprising:
   calculating a risk score associated with the anomalous event based at least in part on identifying the existence of the anomalous event.

7. The method of claim 6, wherein calculating the risk score further comprises:
   applying a scoring formula to the anomalous event based at least in part on properties associated with the at least one cluster.

8. The method of claim 1, further comprising:
   receiving feedback from the administrator regarding a confidence level of the anomalous event.

9. The method of claim 1, wherein the plurality of computing devices are associated with a single enterprise.

10. The method of claim 1, further comprising:
    analyzing a set of behaviors associated with the at least one cluster.

11. The method of claim 10, wherein analyzing further comprises:
    determining a relationship of data that compose the at least one cluster.

12. The method of claim 10, wherein analyzing further comprises:
    applying a set of rules associated with previously determined behavior to the at least one cluster, the previously determined behavior determined by an administrator.

13. The method of claim 12, wherein the previously determined behavior is malicious behavior.

14. The method of claim 10, wherein analyzing further comprises:
    calculating a set of properties associated with the at least one cluster.

15. A computing device configured for behavioral analysis, comprising:
    a processor; and
    memory in electronic communication with the processor, wherein the memory stores computer executable instructions that when executed by the processor cause the processor to perform the steps of:
        receiving data associated with execution of a scripting utility operating on a plurality of computing devices;
        executing a clustering algorithm on the received data;
        identifying at least a first cluster corresponding to a first subset of the plurality of computing devices that execute a first usage of the scripting utility and a second cluster corresponding to a second subset of the plurality of computing devices that execute a second usage of the scripting utility that is different from the first usage of the scripting utility based at least in part on executing the clustering algorithm;
        identifying an existence of an anomalous event associated with the scripting utility based at least in part on executing the clustering algorithm, identifying the existence of the anomalous event including determining the anomalous event is an anomaly with respect to each computing device of the first subset of computing devices that execute the first usage of the scripting utility and the second subset of computing devices that execute the second usage of the scripting utility; and
        transmitting an indication of the anomalous event to an administrator.

16. The computing device of claim 15, wherein the instructions executed by the processor further perform the steps of:
    receiving data continuously over a pre-determined period of time.

17. The computing device of claim 15, wherein when the processor receives data, the instructions executed by the processor further perform the steps of:
    receiving data related to at least one of prevalence of command line usage, frequency of use, how the scripting utility is launched, time of invocation of the scripting utility, information related to access to remote internet protocol addresses, or any combination thereof.

18. The computing device of claim 15, wherein when the processor receives data, the instructions executed by the processor further perform the steps of:
    receiving data related to at least one of prevalence of command line usage, frequency of use, how the scripting utility is launched, time of invocation of the scripting utility, information related to access to remote internet protocol addresses, or any combination thereof.

19. A non-transitory computer-readable storage medium storing computer executable instructions that when executed by a processor cause the processor to perform the steps of:
    receiving data associated with execution of a scripting utility operating on a plurality of computing devices;
    executing a clustering algorithm on the received data;
    identifying at least a first cluster corresponding to a first subset of the plurality of computing devices that execute a first usage of the scripting utility and a second cluster corresponding to a second subset of the plurality of computing devices that execute a second usage of the scripting utility that is different from the first usage of the scripting utility based at least in part on executing the clustering algorithm;
    identifying an existence of an anomalous event associated with the scripting utility based at least in part on executing the clustering algorithm, identifying the existence of the anomalous event including determining the anomalous event is an anomaly across each computing device of the plurality of computing devices; and
    transmitting an indication of the anomalous event to an administrator.

* * * * *